(12) United States Patent  
Falkenberg

(10) Patent No.: US 11,632,935 B2  
(45) Date of Patent: Apr. 25, 2023

(54) DOG COLLAR-LEASH COMBINATION

(71) Applicant: Walburga Falkenberg, Rosengarten (DE)

(72) Inventor: Reto Falkenberg, Rosengarten (DE)

(73) Assignee: Walburga Falkenberg, Rosengarten (DE)

(*) Notice: Subject to any disclaimer, the term of this patent is extended or adjusted under 35 U.S.C. 154(b) by 183 days.

(21) Appl. No.: 16/477,951

(22) PCT Filed: Jan. 25, 2018

(86) PCT No.: PCT/DE2018/100063  
§ 371 (c)(1),  
(2) Date: Jul. 15, 2019

(87) PCT Pub. No.: WO2018/141334  
PCT Pub. Date: Aug. 9, 2018

(65) Prior Publication Data  
US 2019/0364849 A1    Dec. 5, 2019

(30) Foreign Application Priority Data

Feb. 2, 2017    (DE) ..................... 20 2017 100 557.7

(51) Int. Cl.  
*A01K 27/00*    (2006.01)  
*A47D 13/04*    (2006.01)

(52) U.S. Cl.  
CPC .......... *A01K 27/001* (2013.01); *A01K 27/004* (2013.01); *A01K 27/005* (2013.01);  
(Continued)

(58) Field of Classification Search  
CPC ...... A01K 27/004; A01K 27/003; A01K 1/04; A01K 27/005; A01K 27/00; A01K 27/009;  
(Continued)

(56) References Cited

U.S. PATENT DOCUMENTS 3,195,202 A * 7/1965 Spence ................. A44C 5/18  
　　　　　　　　　　　　　　　　　　　　　　D11/216  
3,817,218 A * 6/1974 Bongiovanni ....... A01K 27/001  
　　　　　　　　　　　　　　　　　　　　　　119/864

(Continued)

FOREIGN PATENT DOCUMENTS

DE    384432 C  * 11/1923  ........... A01K 27/004  
DE    384432 C    11/1923  
(Continued)

OTHER PUBLICATIONS

International Search Report dated Apr. 26, 2018, in International Application No. PCT/DE2018/100063.

(Continued)

*Primary Examiner* — Peter M Poon  
*Assistant Examiner* — Jeffrey R Larsen  
(74) *Attorney, Agent, or Firm* — Patent Central LLC; Stephan A. Pendorf

(57) ABSTRACT

A dog collar-leash combination including a collar (1) and a leash (2) in a housing (20), which leash is made available by means of a rolling and unrolling mechanism (21). The leash (2) in the housing (20) can be unwound against a spring force. An outer end of the leash (2) has a grip (22). The collar (1) has first and second free ends (11, 12) and the housing (20) for the leash (2) is provided on the first end (11) and a loop (13), through which the leash (2) is fed, is provided on the second end (12).

11 Claims, 1 Drawing Sheet

Figure 1:
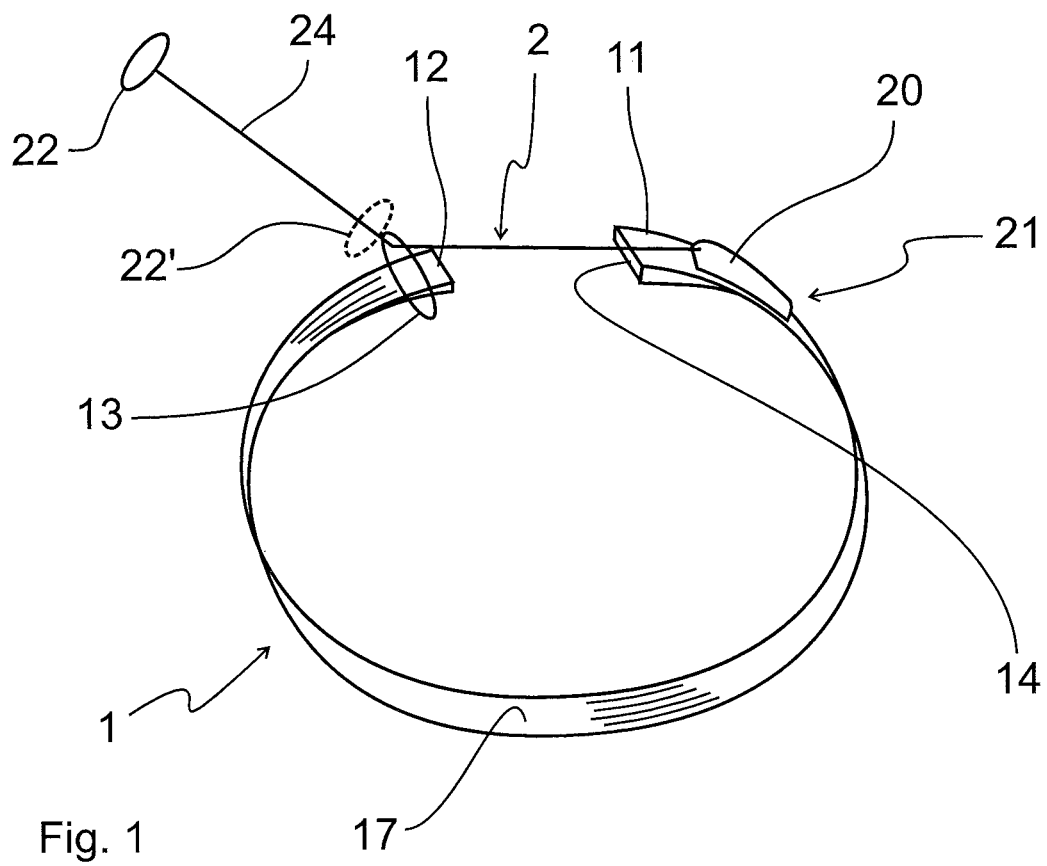

(52) U.S. Cl.
CPC ........ *A01K 27/009* (2013.01); *A44D 2203/00* (2013.01); *A47D 13/046* (2013.01)

(58) Field of Classification Search
CPC .. A01K 27/001; A47D 13/086; A47D 13/046; A44D 2203/00; A44C 5/18; A44B 11/00; Y10T 24/45723
USPC ................................ 119/795, 794, 797, 792
See application file for complete search history.

(56) References Cited

U.S. PATENT DOCUMENTS

| | | | |
|---|---|---|---|
| 4,328,767 A * | 5/1982 | Peterson | A01K 27/004 |
| | | | 119/794 |
| 4,328,797 A | 5/1982 | Peterson | |
| 5,816,198 A | 10/1998 | Peterson | |
| 6,481,382 B2 | 11/2002 | Cohn | |
| 7,174,857 B2 | 2/2007 | Lord | |
| 9,844,208 B2 * | 12/2017 | Harris, II | A47D 13/086 |
| 2001/0015179 A1 | 8/2001 | Fountoulakis | |
| 2006/0021585 A1 * | 2/2006 | Hurwitz | D07B 1/148 |
| | | | 119/795 |
| 2009/0255486 A1 | 10/2009 | Thompson et al. | |
| 2010/0162966 A1 * | 7/2010 | McFarland | A01K 27/001 |
| | | | 119/794 |
| 2010/0212601 A1 * | 8/2010 | Hurwitz | A01K 27/004 |
| | | | 119/794 |
| 2014/0116354 A1 | 5/2014 | Harris | |
| 2016/0066543 A1 * | 3/2016 | Couillard | A01K 27/001 |
| | | | 119/864 |
| 2016/0135431 A1 * | 5/2016 | Sheldon | A01K 11/008 |
| | | | 119/859 |

FOREIGN PATENT DOCUMENTS

| | | |
|---|---|---|
| DE | 2704228 A1 | 8/1978 |
| DE | 7736528 U1 | 9/1978 |
| DE | 8031227 U1 | 4/1981 |
| DE | 9112680 U1 | 2/1993 |
| DE | 10012699 C1 | 9/2001 |
| DE | 102004038935 A1 | 2/2006 |

OTHER PUBLICATIONS

German Search Report dated Jan. 8, 2018, in German Application No. 20 2017 100 557.7.

* cited by examiner

DOG COLLAR-LEASH COMBINATION

This invention relates to a dog collar-leash combination with a collar and with a leash in a housing, with a rolling and unrolling mechanism, wherein the leash in the housing can be unwound against a spring force and where the outer end of the leash has a handle. In the following it will be clarified that this is a collar-leash combination for animals, especially dogs, but not limited to dogs. The term "dog collar-leash combination" is therefore intended to extend to other animals that are led on collars with a leash, such as for example cats or the like.

Retractable dog leashes on a dog collar are known in different embodiments. DE 27 042 28 A1 describes, for example, a self-retractable dog leash, which is retractable into a housing via a steel spring. It is also intended that the pulled-out dog leash can be locked and unlocked by a separate button.

Furthermore, from DE 77 36 528 U1 a dog collar is known onto which a housing made of plastic or metal is attached, wherein a dog leash is housed self-retractable via a spiral tension spring. Similar embodiments are shown in DE 80 31 227 U1 or DE 91 12 680 U1.

U.S. Pat. No. 7,174,857 B2 describes an animal collar with an integrated leash that can be pulled out of a housing.

DE 10 2004 038 935 A1 shows a slightly different embodiment, in which a dog collar has an integrated dog leash wrapped around the dog collar.

DE 100 12 699 C1 shows another variant of a dog collar having an inwardly directed inner band and an outer band situated on the outside, wherein the outer band is elastically extensible or extensible against a restoring force. Thus, if needed, a strap is pulled out of the collar from two sides, which allows the dog to be led.

The disadvantage, however, is that the known dog collars with an integrated, retractable dog leash must first be put on around the neck of the animal in the usual way with an adjusted, fixed neck width. Furthermore, a contracting function is not provided in the known dog leashes.

The object of the invention is therefore to form the rolling-up mechanism of the retractable leash which is located on the collar in such a way that an easy putting-on of the collar and a retraction function are integrated.

This problem is solved with a dog collar-leash combination according to claim 1. Since the collar has two free ends, it is not fixed around the neck of the animal, but can be further opened by pulling of the leash from the housing. This is possible because at the first end there is a housing for the leash and thus the leash is stored and at the second end a loop is provided through which the handle of the leash is fed. In this combination, the leash can be grabbed at the handle by a user and pulled out of the housing to the maximum length. In this case, the dog collar-leash combination acts like a conventional collar to which a leash is attached, but here there is no firm connection between the two ends of the collar, so there is no solid neck loop, but a variable loop.

If the two ends of the collar have mutual support elements, then when pulling on the leash, whether from the animal or the pet handler, as the two ends of the collar are moved towards each other only so far until the support elements of the two ends support each other. This ensures that the collar is not pulled tighter and thus the animal is not affected adversely or even injured.

In a further embodiment, the collar is adjustable in its length. This allows the collar to be adjusted to the circumference of the neck of the animal. Since the collar can expand in this design against the spring force of the retracting mechanism, the collar can also be set a little tighter on the animal, so when using the dog collar-leash combination with a strong pull on the leash, a slight strangling function by the contraction of the collar is reached at its minimum circumferential length. In normal situations the collar would stay closed merely with a light spring tension around the neck of the animal.

To further improve the comfort of the dog collar-leash combination for the animal, the spring force for retracting the leash can be made adjustable. This makes it possible to adjust the spring force so that the collar closes around the neck of the animal with sufficient astringent effect without overly adversely affecting the animal.

By providing a locking mechanism on the rolling and unrolling mechanism, with which the leash can be locked in any particular length, the leash can be locked in any extended position. When the leash is locked in the fully rolled up condition, a conventional dog collar in a rigid, closed form that attaches itself to the neck of the animal exists. For example, if the leash is completely unrolled and then locked, the result is a typical dog leash situation in which the dog handler can easily lead the animal. The only difference to previous dog collars is that the collar simply forms an expandable loop around the neck, as already described above.

When the two ends of the collar have coupling means for connecting the two ends, the collar can be converted through the coupling means, by coupling the two ends, into a conventional collar fixedly placed around the animal's neck. Preferably, the coupling means consist of a snap hook at the first end and a loop at the second end of the collar. In this case, the snap hook is hooked into the loop at the other end of the collar so that the collar can no longer be widened by the leash passing through the loop.

A reliable rolling and unrolling mechanism for the leash is provided in the housing in that the rolling and unrolling mechanism in the housing has a helical retracting spring and a rotatable supported cartridge for the rollable and unrollable leash.

In order to provide a flexible, easily retractable and at the same time stable leash, the leash is formed of a braided rope, preferably nylon. If the collar is formed from a flat ribbon textile fabric, preferably nylon, a collar for the animal that is well-wearable and stable is indicated.

If a fastener is provided at the outer end of the leash or on the handle to fix this on the collar, it is prevented that the outer end of the leash, the handle or the loop arranged at the outer end of the leash of this dog collar-leash combination dangles down and the dog with this dangling leash gets caught on any objects. For the user, the access to the outer leash end or handle or handle loop is always guaranteed. Preferably, the fastening means is a magnetic coupling.

An embodiment of the invention is described below in detail with reference to the accompanying drawings.

Figure 2:
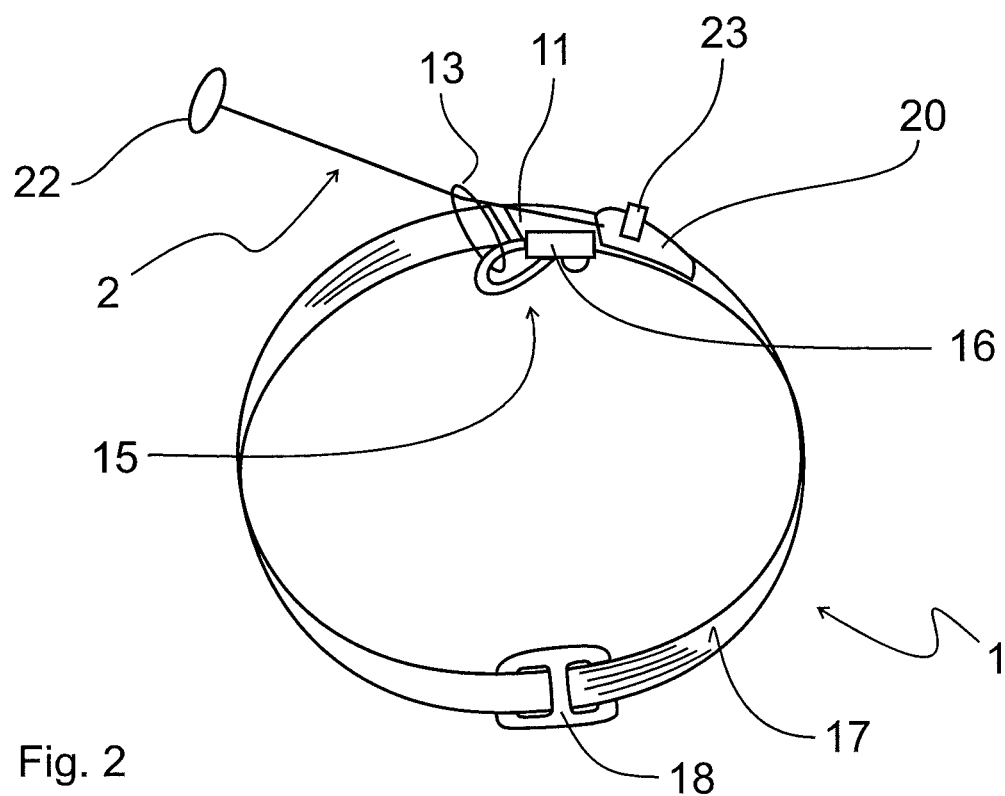

There is shown in:

FIG. 1 a three-dimensional view of a dog collar-leash combination in a first embodiment and FIG. 2 a three-dimensional view of a dog collar-leash combination in a second embodiment.

FIG. 1 shows a three-dimensional view a dog collar-leash combination with a collar 1 and a leash 2 arranged in a housing 20. The collar 1 is comprised of a flat ribbon textile fabric 17, which can be placed around the neck of an animal, in particular a dog, not shown here. The collar 1 has two ends, namely a first end 11, near the housing 20 for the leash 2, and a second end 12, where a loop 13 is arranged, through which the leash 2 is passed.

The two ends 11, 12 have matching support elements 14, so when pulling the two ends 11, 12, these support elements 14 abut against each other, as shown in FIG. 2.

In the housing 20 for the leash 2 there is a rolling and unrolling mechanism 21 fitted with a helical spring, not shown, and a rotatable cartridge for the rolled up leash 2. The free end of the leash 2 is equipped with a grip 22, which on the one hand serves for comfortable holding of the leash 2, and on the other hand prevents that the leash 2 can completely slip through the loop 13. The leash 2 consists of a braided core/cladding rope 24 made of nylon threads.

FIG. 2 shows a three-dimensional view of the dog collar-leash combination as a second embodiment, in which functionally identical components compared to the embodiment according to FIG. 1 are designated by the same reference numerals. In FIG. 2—as already stated above—the two ends 11, 12 of the collar 1 with its supporting elements 14 are shown lying against each other. In addition to the embodiment according to FIG. 1, the dog collar-leash combination according to FIG. 2 shows a coupling element 15, which has a snap hook 16 attached to the first end 11 of the collar 1, and the loop 13, through which the leash 2 is run. The snap hook 16 is hooked into the loop 13, so the collar 1 forms a rigid encirclement around the neck of the animal. For adjusting the circumferential length of the collar 1 to the respective neck circumference of the handled animal, the collar 1 has an adjustment 18.

The operating principle of the dog collar-leash combination is described below with reference to the two embodiments illustrated in FIGS. 1 and 2.

In the basic position of the dog collar-leash combination the two ends 11, 12 of the collar 1 lie with their supporting elements 14 against each other and the leash 2 runs from the housing 20 through the loop 13, with the grip 22 of the leash 2 situated directly at the loop 13. The spring tension of the rolling and unrolling mechanism 21 causes a load to be applied to the two ends 11, 12 or the support elements 14, wherein the collar 1 is expandable against this spring retracting force, in that the leash 2 is pulled out of the housing 20. In this situation the dog collar-leash combination is shown in FIG. 1 with the grip 22' (shown in dashed lines).

The dog handler can thus grab the collar 1 on both sides of the ends 11, 12 and can open it against the spring restoring force of the leash 2 (as shown in FIG. 1) and pull the collar 1 over the dog's head and put it on properly. If the dog handler grabs the grip 22 and pulls on the leash 2, the leash is unrolled from the housing 20 against the spring force of the rolling and unrolling mechanism 21, this situation is shown in FIG. 1 with grip 22 (not dashed). In this situation, the dog leader can handle the dog comfortably on the leash 2. If the dog handler lets go of the grip 22, the leash 2 rolls up via the rolling and unrolling mechanism 21 and the spring provided therein, so that the grip 22 lies again on the loop 13 in position 22' (dashed).

In the second embodiment shown in FIG. 2, compared to the functionalities of the embodiment shown in FIG. 1, it is additionally provided that the two ends 11, 12 of the collar 1 are engaged via the coupling element 15 in a form of a snap hook 16, which is lockable in the loop 13, rigidly fitting the collar 1 around the animal neck. Furthermore, the flat ribbon textile fabric 17 of the collar 1 has an adjustment 18 for precisely fitting of the circumference of the collar 1 for the particular animal.

If the coupling element 15 is unlocked via the snap hook 16, the dog collar-leash combination according to FIG. 2 has the same functionality as the corresponding embodiment of FIG. 1. With connected coupling element 15, however, a conventional dog collar 1 with a retractable dog leash 2 results. In addition, however, the rolling and unrolling mechanism 21 can be locked at the housing 20 in the respective position of the leash 2 via a locking mechanism 23. For example, the leash 2 can be completely unrolled with pulling on the grip 22 and then the locking mechanism 23 can be locked, so that a conventional dog collar-leash combination with a fixed collar and a fixed leash is present. If the locking mechanism 23 is unlocked and the leash 2 is retracted back into the housing 20 via the rolling and unrolling mechanism 21, the leash can of course be locked again in any intermediate position as well as the fully retracted leash via the locking mechanism 23.

Advantageously, the dog collar-leash combination according to this application can easily be put on by stretching and pulling over the head of the animal. With his collar, the dog always wears the leash 2 in the housing 20 with him. By grasping the handle 2, the dog handler can immediately unroll the leash 2 for a comfortable leading of the dog. Due to the additional functions of the locking mechanism 23, different lengths of dog leash 2 can be fastened, or even the position with the grip 22 adjacent at the loop 13 can be locked where practically a conventional collar (which is not expandable against the restoring force of the leash) is provided. By loosening the locking mechanism 23 the special function is again immediately activated. A rigid function of the collar 1 can be created with further development through the coupling element 15, even though the leash 2 is pulled out against the spring force. In a further embodiment the locking mechanism 23 of the leash 2 can bring about that the known functions of a fixed dog collar and a fixed dog leash are present.

LIST OF REFERENCE NUMBERS 1 collar
11 first end
12 second end
13 loop
14 support element
15 coupling element
16 snap hook
17 flat ribbon textile fabric
18 adjustment
2 leash
20 housing
21 rolling and unrolling mechanism
22 grip
23 locking mechanism
24 braided core/cladding rope

The invention claimed is:

1. A dog collar-leash combination with a collar (1) and with a leash (2) provided in a housing (20) with a rolling and unrolling mechanism (21) having a spring restoring force,
   wherein the leash (2) in the housing (20) can be unwound against the spring restoring force,
   wherein an outer end of the leash (2) has a grip (22),
   wherein the collar (1) has first and second free ends (11, 12), wherein the housing (20) for the leash (2) is provided at the first end (11) of the collar (1) and a loop (13), through which the leash (2) is fed, is provided at the second end (12) of the collar (1) opposite the housing (20),
   wherein the grip (22) is dimensioned as to not be able to pass through the loop (13), wherein the first and second ends (11, 12) of the collar (1) have mutual support elements (14), wherein the dog collar (1) is adapted to being opened by separating the first and second ends of the collar (1) against the spring restoring force of the rolling and unrolling mechanism (21), and wherein the spring restoring force of the rolling and unrolling mechanism (21) is adapted to pull the grip against loop (13) until the support elements of the first and second ends of the collar (1) abut against each other closing the collar.

2. The dog collar-leash combination according to claim 1, wherein the collar (1) is adjustable in its length.

3. The dog collar-leash combination according to claim 1, wherein the spring force for rolling up the leash (2) is adjustable.

4. The dog collar-leash combination according to claim 1, wherein the rolling and unrolling mechanism (21) has a locking mechanism (23), with which the leash (2) can be locked in any particular length.

5. The dog collar-leash combination according to claim 1, wherein the first and second ends (11, 12) of the collar (1) have a coupling element (15) for connecting the two ends (11, 12).

6. The dog collar-leash combination according to claim 5, wherein the coupling element (15) consists of a snap hook (16) at the first end (11) and the loop (13) at the second end (12) of the collar (1).

7. The dog collar-leash combination according to claim 1, wherein the rolling and unrolling mechanism (21) in the housing (20) has a helical retracting spring and a rotatable associated cartridge for the retractable leash (2).

8. The dog collar-leash combination according to claim 1, wherein the leash (2) is made of a braided core/cladding rope (24).

9. The dog collar-leash combination according to claim 1, wherein the collar (1) is made of a flat ribbon textile fabric (17).

10. The dog collar-leash combination according to claim 1, wherein the leash (2) is made of a braided core/cladding nylon rope (24).

11. The dog collar-leash combination according to claim 1, wherein the collar (1) is made of a nylon flat ribbon textile fabric (17).

* * * * *